Sept. 19, 1944.   W. S. TANDLER ET AL   2,358,746
CONTROL MECHANISM FOR MACHINE TOOLS
Filed Jan. 1, 1942   5 Sheets-Sheet 4

Fig.10

CONTROLS STARTING OF SPINDLE HEAD MOTOR.
ONE REV. OF DRUM EQUALS ½" LONG. TRAVEL OF MACHINE TABLE.
DRUM DIVIDED INTO 8 EQUAL SPACES EACH SPACE GIVES $\frac{1}{16}"$ OF TABLE TRAVEL.

CONTROLS DIRECTION OF ROTATION OF SPINDLE HEAD MOTOR.
HELICAL LINES HAVE A LEAD EQUAL TO LEAD OF DRUM SCREW.

ONE REV. OF DRUM EQUALS .250" VERTICAL TRAVEL OF SPINDLE HEAD.
Fig.11
DRUM DIVIDED INTO 125 EQUAL SPACES. EACH SPACE GIVES .002" OF SPINDLE HEAD TRAVEL.

CONTROLS STOPPING OF SPINDLE HEAD MOTOR.
HELICAL LINES HAVE A LEAD EQUAL TO LEAD OF DRUM SCREW.

Fig.13

Witness
Charles J. Olson

Inventors
William S. Tandler
David S. Walker
Fred Hildreth
by Cary & Jenney attys Sept. 19, 1944.  W. S. TANDLER ET AL  2,358,746
CONTROL MECHANISM FOR MACHINE TOOLS
Filed Jan. 1, 1942  5 Sheets-Sheet 5

Fig.12

Witness
Charles T. Olson

Inventors
William S. Tandler
David S. Walker
by Fish Hildreth
Cary & Jenney attys Patented Sept. 19, 1944

2,358,746

UNITED STATES PATENT OFFICE 2,358,746

CONTROL MECHANISM FOR MACHINE TOOLS

William S. Tandler and David S. Walker, New York, N. Y., assignors to Brown and Sharpe Manufacturing Company, a corporation of Rhode Island Application January 1, 1942, Serial No. 425,310

27 Claims. (Cl. 90—13.5)

The present invention relates to improvements in control mechanism for machine tools, and more particularly to a novel and improved control means for effecting relative positioning movements of two supports movable in diverse directions, in accordance with a predetermined pattern of operation.

The invention is herein disclosed in a preferred form as embodied in a profiling attachment for a milling machine having a reciprocable work table, a milling cutter spindle and a spindle supporting head which is vertically movable toward and away from the work.

For use in profile milling in which the milling cutter follows an irregular or contoured path, it is customary to provide a metal pattern or template which is shaped to correspond with the desired contour, and is secured to the work table as a guide for determining the vertical adjustment of the spindle head during the progress of the milling operation.

It is a principal object of the invention to provide a novel and improved profiling attachment in which pattern control devices of arbitrary or conventional form may be employed for producing the desired relative contour-producing movement of the tool and work.

It is another object of the invention to provide a novel and improved pattern control mechanism for effecting relative positioning movements of supports movable in diverse directions in which the relative positioning movements are effected by means of a long series of very small stepped adjustments to insure a maximum degree of accuracy in the production of the desired contour.

It is another object of the invention to provide a pattern control mechanism of this general description for controlling the relative positions of two supports movable in diverse directions which is particularly constructed and arranged to avoid any accumulation or building up of possible errors in the operation of the pattern control in effecting successive stepped adjustments of the relative positions of the supports.

Other objects of the invention relate to specific features of construction and arrangement of applicants' profiling attachment which contribute in producing a more efficient and accurate operation of the machine.

With these and other objects in view, as may hereinafter appear, a feature of the invention consists in the provision in a machine of the general type described having a plurality of supports arranged for back and forth movements in diverse paths, of pattern control devices comprising pattern elements with arbitary or conventional indicia thereon, and actuating means responsive to the dictation of the indicia for starting and stopping and for controlling the direction of movement of at least one of the supports to produce an irregular or contoured pattern of relative movement. In the illustrated embodiment of the invention, a pattern mechanism in the form of a photo-electric cell scanning device responsive to variations in the amount of light reflected from a pattern card or similar element is employed, which is in many respects similar to that described and claimed in applicants' copending application Serial No. 349,968, filed August 2, 1940, now Patent No. 2,336,376, issued December 7, 1943, for Photoelectric control devices.

Another feature of the invention consists in the provision of separate pattern elements with indicia thereon arranged to move in timed relation with the work support and with the tool support, and means actuated by said pattern elements for effecting a series of stepped positioning movements of the tool support during the continued movement of the work support in accordance with a predetermined pattern of operation.

Another feature of the invention consists in the specific construction and arrangement of the pattern control mechanism to include a pattern device which is synchronized with the positioning movements of the spindle head, and has for its operating function to stop the movement of the spindle head in each succeeding adjusted position. With this construction and arrangement of the pattern control mechanism, any possible building up or accumulation of error which might appear in the operation of the pattern mechanism is avoided.

Another feature of the invention consists more specifically in the construction and arrangement of the mechanism for driving the pattern drum associated with the spindle head to maintain a uni-directional rotation of the pattern drum in synchronism with movement of the spindle head during the continued operation upon a work piece, irrespective of any reversals which may take place in the direction of movement of the spindle head.

Other features of the invention consist also in the devices, combinations and arrangement of parts hereinafter described and claimed which, together with the advantages to be obtained thereby, will be readily understood by one skilled in the art from the following description taken in connection with the accompanying drawings, in which

Applicants' improved profiling attachment is herein disclosed as applied to a milling machine of the general type having a longitudinal work table and a vertically adjustable milling cutter spindle. The illustrated machine is similar to that set forth in the patent to Bennett and Krause, for Milling machines, No. 2,068,840, dated January 26, 1937. Referring to the drawings, the machine comprises a base 20, on which is mounted a longitudinally reciprocable work table 22 and a column 24 which provides support for a vertically adjustable milling cutter spindle head 26. The machine is provided with a horizontally extending milling cutter spindle 28, to which is fitted a milling cutter 32.

The spindle 28 is driven from an electric motor 30 and appropriate driving connections carried on the spindle head 26. These, as best shown by dotted lines in Fig. 1, include a pinion 34, armature shaft 36 of the motor 30, a gear 38 carried on a shaft 40, a pair of pick-off gears 42, 44 mounted respectively on the shaft 40, and on a shaft 46 which is in turn connected through bevel gears 48 and 50 to drive the spindle.

Figure 3:
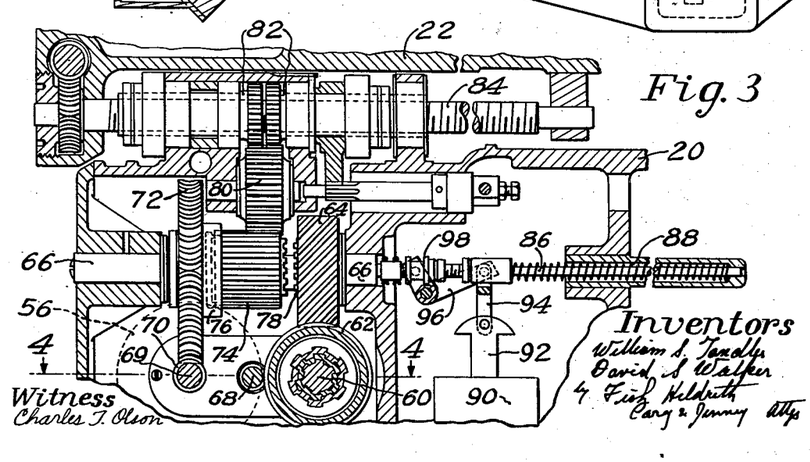
Fig. 3 is a detail view in front elevation of the base portion of the machine and with parts sectioned or broken away to illustrate particularly the driving and clutching connections for the work supporting table.
Figures 4, 5:
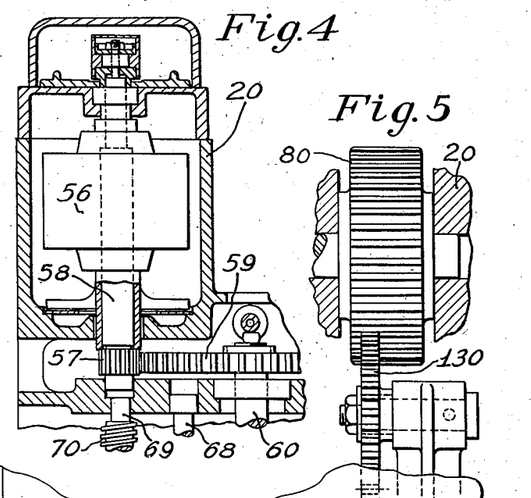
Fig 4 is taken on section line 4—4 of Fig. 3.
Fig. 5 is a detail plan view, partly in section, illustrating particularly the table pattern drum and the driving connections therefor.

As best shown in Figs. 3 and 4, the work table 22 is driven from an electric motor 56 mounted in the base 20 of the machine through driving connections which may be of ordinary description, and which are more fully set forth in the patent of Bennett and Krause above referred to. These connections include a pinion 57 mounted on the armature shaft 58 of the motor, and adapted to mesh with a large gear 59 on a parallel operating shaft 60. The quick traverse drive is taken from the shaft 60 through a spiral gear 62 on the shaft 60, and a cooperating spiral gear 64 loosely supported to turn on a shaft 66. The feed drive is taken from the operating shaft 60 through a series of pick-off gears carried on the shaft 60 and on two parallel shafts 68 and 69. A worm 70 on the shaft 69 meshes with a worm wheel 72 loosely supported to turn on the shaft 66. A feed-quick traverse clutch member in the form of a gear 74 is interposed between the feed worm wheel 72 and quick traverse gear 64 on the shaft 66, and is axially shiftable from an intermediate neutral position into clutching engagement with either of them. In the feed position the feed-quick traverse clutch gear 74 engages with a feed driving element in the form of an internal gear 76 formed on one face of the worm wheel 72. Movement of the feed-quick traverse clutch member 74 from neutral position in the opposite direction engages cooperating clutch faces on the member 74 and quick traverse driving gear 64. The feed-quick traverse clutch gear 74 meshes with an idler gear 80, which in turn meshes with sleeve nut elements 82, screw-threaded to the table-feed screw 84 carried on the work table 22.

For controlling the position of the quick traverse clutch gear 74, a shifting rod 86 is provided, which extends axially within a bore formed in the shaft 66, and is connected at its inner end by a cross pin to the gear 74. A compression spring 88 coiled about the rod 86 tends to shift the rod and the clutch gear leftwardly into engagement with the feed clutch member 76. The rod 86 and the clutch gear 74 are moved axially to the right to the quick traverse position against the pressure of spring 88 by the action of a solenoid 90, the armature 92 of which is connected by a link 94 with the free arm of a forked clutch shifting lever 96.

Figures 6, 7:
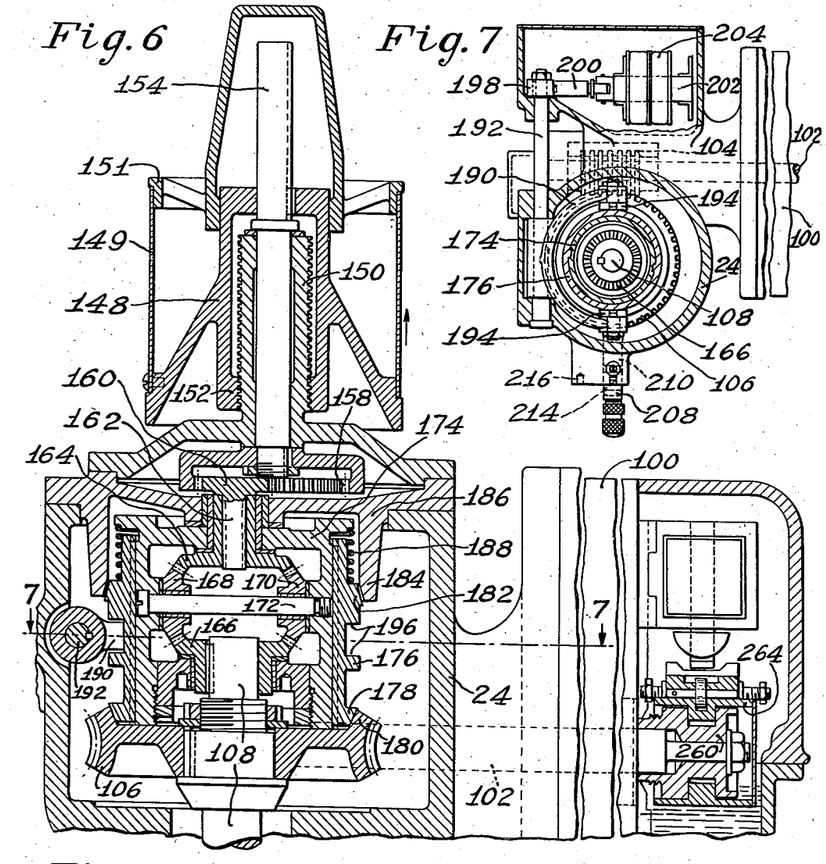
Fig. 6 is a view in front elevation illustrating on a larger scale the vertical feed driving connections for the spindle head, together with the pattern drum and the reversible connections for driving the same in synchronism with the spindle vertical feed.
Fig. 7 is a detail sectional plan view taken on the line 7—7 of Fig. 6.

Power adjustment of the vertical position of the spindle head 26 is effected by means of an electric motor 100, carried in the upper portion of the machine column 24. The motor 100 is connected through shaft 102 and worm 104 with a worm gear 106 secured to the upper end of the spindle head feed screw 108 which is in threaded engagement with a nut 110 rigidly mounted within the spindle head 26.

The profiling attachment which forms more specifically the subject-matter of the present invention, comprises a pattern drum synchronized with the translatory movements of the work table, and scanning devices associated therewith operative to control the starting and direction of movement of the spindle head, a second pattern drum synchronized with movement of the spindle head and a scanning device associated therewith for arresting movement of the spindle head in the desired adjusted position.

The moving element of the pattern control device synchronized with relation to the translatory movement of the work table for starting and for controlling the direction of movement of the spindle head, comprises a pattern drum 112 which is mounted at the left-hand end of the machine, and is arranged to be driven directly from the table actuating mechanism in synchronized relation thereto. As best shown in Fig. 5, the pattern drum 112 is fitted over a sleeve support 114 secured to the machine frame, and is operatively connected thereto by the engagement of a nut portion 116 on the drum 112 with the screw-threaded external periphery of the sleeve support 114. With this construction, rotational movement of the drum 112 is combined with an axial movement thereof to cause the relatively stationary scanning devices hereinafter described, to follow helical paths or tracks on the periphery of the drum. Rotational movements are imparted to the drum 112 through connections which include a telescoping drive shaft. This shaft comprises an axially shiftable rod 118 connected at its outer end to the drum 112, and at its other end keyed to turn with and to slide axially within a sleeve shaft 120 which is in turn rotationally supported within the sleeve support 114. The sleeve shaft 120 has formed at its forward or outer end a bevel gear 122 which meshes with a bevel gear 124 on a drive shaft 126 extending laterally along the front side of the machine. The shaft 126 is connected to be driven from the idler gear 80 of the table driving gear train through a series of idler gears, which include an idler 130 meshing with the idler gear 80 and idler 132 and a gear 134 secured to the shaft 126.

For convenience in setting up the machine for operation on a particular work piece, the pattern drum 112 is constructed and arranged to permit the substitution of one pattern card for another with a minimum of effort. As best shown in Fig. 5, the pattern card takes the form of a cylinder 136, which is supported at one end on a flange portion 138 of the drum, and at its other end on a removable flange or ring 140, which is held in place on the drum by the engagement of a spring-pressed plunger 142 with an annular recess in the peripheral surface of the drum.

The moving element of the pattern control synchronized with the movement of the spindle head 26, comprises a pattern drum 148 which is mounted on the top of the machine column and is arranged to be driven from the spindle head feed screw 108 through reversing mechanism arranged to cause the drum 148 to be continuously rotated in the same direction during the operation on a work piece, irrespective of changes in the direction drive of the spindle head adjusting screw 108. A pattern card 149 is removably supported on the drum 148 between the flanged lower end of the drum and a removable flange 151 fitted to the upper end of the drum. The pattern drum 148 is fitted over a vertically arranged sleeve support 150 and has formed in the lower end thereof a nut portion 152 which meshes with a screw thread cut in the external periphery of the sleeve support 150. The drum 148 is rotated by means of a shaft 154 which is mounted within the sleeve support 150, and has formed in the upper portion thereof a keyway, by means of which the drum 148 is keyed to turn with and is permitted to move vertically with relation to the shaft 154. An internal gear 158 secured to the lower end of the shaft 154 is arranged to mesh with a pinion 160 formed in the upper end of a short shaft 162. The shaft 162 is arranged to be driven from the worm gear 106 and feed screw 108 through a reversing mechanism which comprises bevel gears 164, 166 oppositely disposed from one another and secured respectively to the shaft 162 and to the upper end of the feed screw 108. The bevel gears 164 and 166 are connected to one another by means of two oppositely disposed idler gears 168 and 170, supported on a cross shaft 172 on a cage 174. Surrounding the cage 174 and keyed to turn therewith is a clutch sleeve 176 which is provided at its lower end with a coned friction clutch surface 178 for engagement with a corresponding friction surface 180 on one face of the worm gear 106. The clutch sleeve 176 is provided also with a friction clutch surface 182 for engagement with a stationary or braking friction surface 184 formed on a stationary ring 186. A compression spring 188 coiled about the clutch sleeve 176 between a shoulder on the clutch sleeve and the flanged upper end of the cage 174 tends to force the clutch sleeve 176 downwardly into clutching engagement with the worm gear 106.

In the operation of the device, downward movement of the clutch sleeve 176 into clutching engagement with the worm gear 106 will cause the cage 174 to turn therewith, thus locking the bevel gears against relative movement. For this position of the parts, the drum 148 is rotated in the same direction as the feed screw 108. Movement of the clutch sleeve 176 upwardly into engagement with the stationary clutch ring 184 will lock the cage 174 against rotational movement, and will cause the drive to be taken from the feed screw 108 and bevel gear 166 through bevel gears 168 and 170 to drive the bevel gear 164 and associated parts, including the drum 148, in an opposite direction with relation to the feed screw 108. Associated with the reversing mechanism above described, applicant provides electrically operated control means which is operative upon each reversal in the direction of drive of the spindle head motor to effect a corresponding adjustment in the position of the clutch sleeve 176, so that the drum 148 will be driven continuously in one direction during the continuance of the milling operation upon a work piece.

Figure 9:
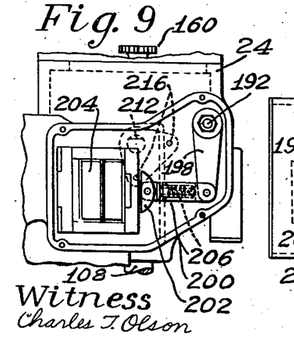
Fig. 9 is a detail view in rear elevation of certain of the parts shown in Fig. 8, and looking from the left with relation to Fig. 8.

The position of the reversing clutch sleeve 176 is controlled through connections comprising a clutch shifting yoke 190 which is secured to a transversely extending rock shaft 192 and is provided with shoes 194 for engagement with an annular groove 196 formed in the peripheral surface of the clutch sleeve 176. A downwardly extending arm 198 secured to the rock shaft 192 is connected by means of a link 200 with the armature 202 associated with clutch reversing solenoid 204. The link 200, as will be evident by an inspection of Figs. 7 and 9, is formed in two parts which are held in closed relation by means of a small compression spring 206 to provide a yielding connection between the solenoid armature 202 and the clutch shifting yoke 190.

Figure 8:
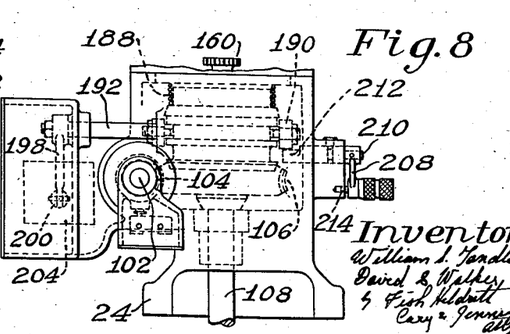
Fig. 8 is a view looking from the left side of the machine and on a smaller scale than Fig. 6, to illustrate particularly the reverser and the mechanism for controlling the position of the same to determine the direction of drive of the pattern drum mounted on the spindle head.

As hereinafter more fully pointed out, the operation of the reversing mechanism for the pattern drum is controlled by the pattern mechanism in such a manner as to keep the drum rotating always in the same direction during the continuance of a milling operation. In order to provide for the quick return of the drum to its initial starting position preparatory for the performance of a new milling operation, applicants provide means for disconnecting the pattern drum 148 from its driving mechanism, so that it may be manually turned back by the operator. To this end, a manual control is provided which is available to shift the clutch sleeve 176 to an intermediate neutral position in which the driving mechanism for the pattern drum 148 is disconnected. The manual control for the reversing clutch sleeve 176 comprises a hand lever 208 which is rigidly secured to a rock shaft 210 horizontally mounted in the machine column, and having its inner end projecting beneath one arm of the clutch yoke 190. The end portion of the rock shaft 210 is slabbed off at 212 to provide a cam surface for engagement with the yoke 190. For the position of the rock shaft in which the slabbed-off portion is uppermost, the yoke 190 and clutch sleeve 176 are permitted to move freely from one operating position to the other. Rotation of the rock shaft 210 through substantially ninety degrees causes the yoke 190 to be engaged against the outer peripheral surface of the rock shaft 210, to raise the clutch yoke 190 and clutch sleeve 176 to an intermediate neutral position in which the clutch sleeve and cage 174 are disconnected and free to rotate independently of the worm wheel 108 and feed screw 106. The manual clutch control is retained in either of its alternative positions by means of a small detent plunger 214 mounted in the clutch control handle 208 for engagement with either of two recesses 216 on the machine column.

For controlling the starting and stopping and direction of rotation of the spindle motor 100 in accordance with a predetermined pattern of operation, applicants provide pattern elements in the form of cards with indicia thereon, which cooperate with photo-electric cell scanning devices.

The scanning devices herein disclosed are substantially similar to those illustrated in applicants' copending application Serial No. 349,968, filed August 2, 1940, for Photo-electric control devices, and comprise in each instance a light source from which a beam of light is directed against the card on the pattern drum, to be reflected by indicia in the form of light reflective spots against a photo-electric cell which is sensitive to variations in the amount of light reflected from the drum.

Figures 1, 2:
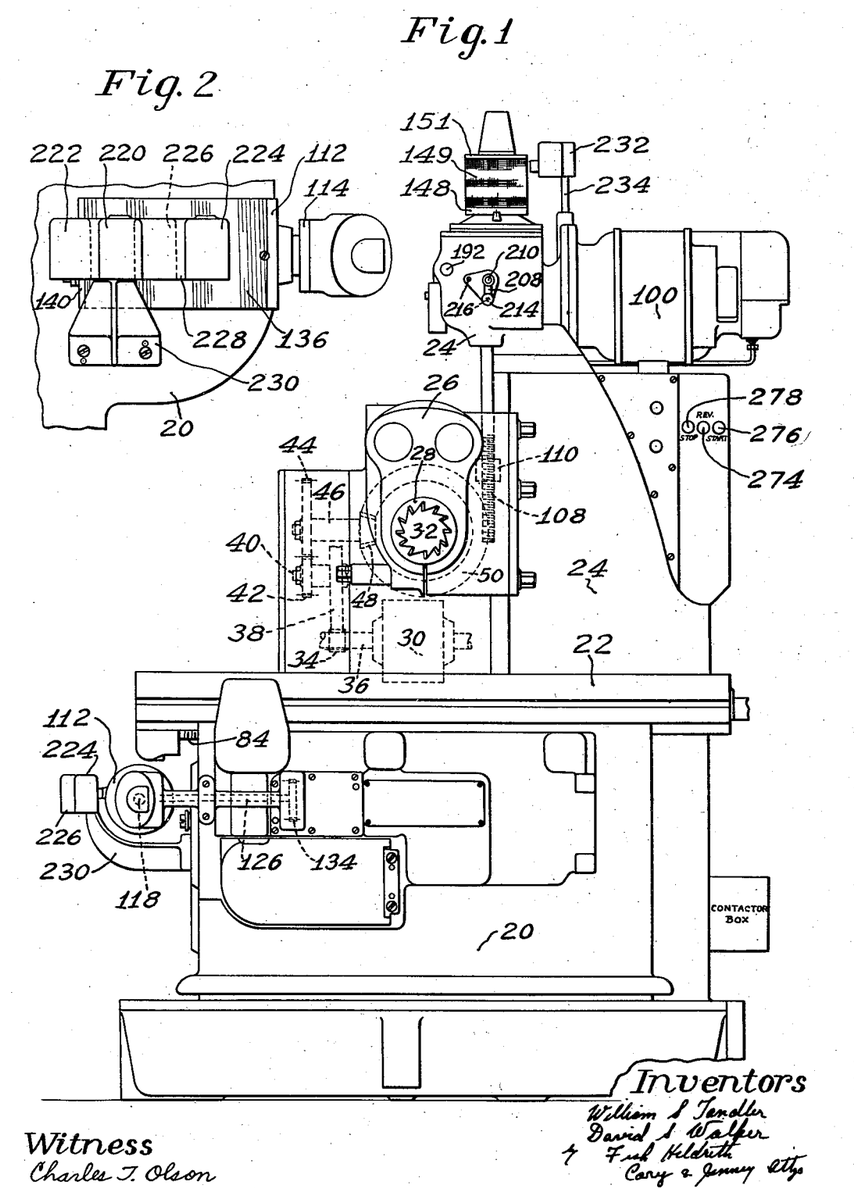
Fig. 1 is a view in front elevation of a milling machine embodying in a preferred form the several features of the invention.
Fig. 2 is a detail view on a larger scale, looking from the left, of the table pattern drum and the associated scanning devices.
Figure 10:
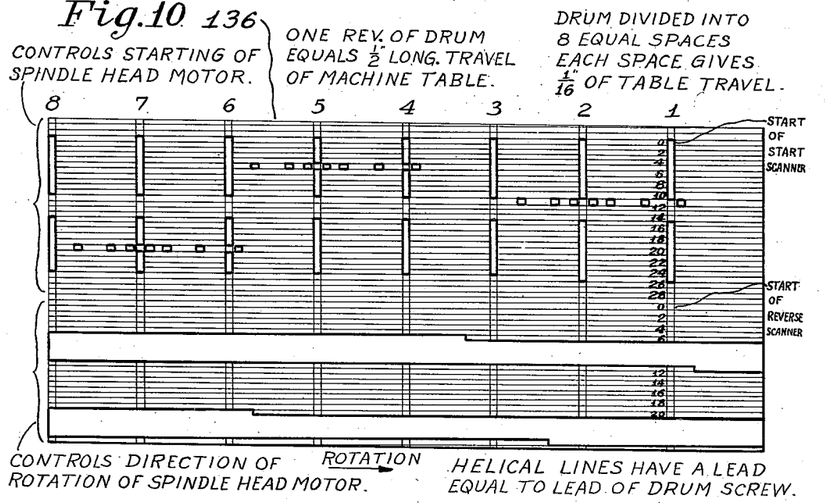
Fig. 10 is a developed view showing in diagrammatic and simplified form the pattern card to be placed on the table pattern drum.
Figure 11:
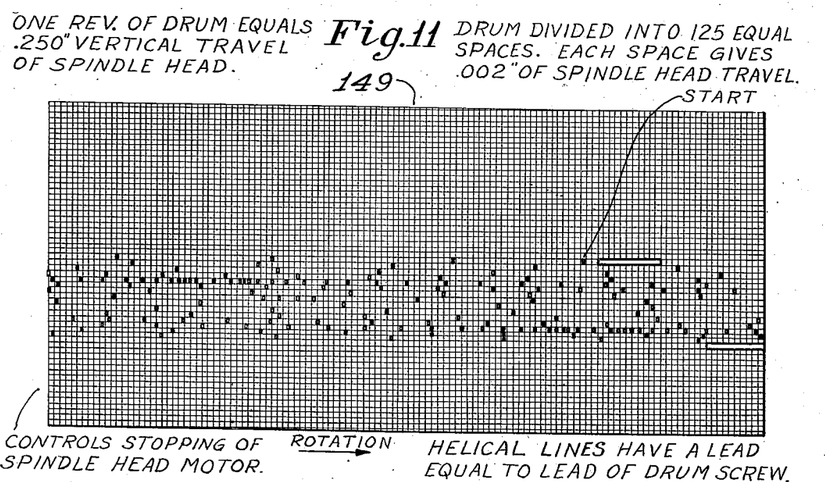
Fig. 11 illustrates in developed form the pattern card to be located on the spindle head drum.

As shown in Figs. 1 and 2, two scanning devices are provided for use with the pattern drum 112 and card 136, consisting of a light 224 and a photo-electric cell 226 for controlling the direction of rotation of the spindle head motor 100, and a light 220 and photo-electric cell 222 for controlling the starting of the spindle head motor 100. These elements are mounted within a unit 228 supported at one side of the pattern drum 112 by means of a bracket 230. A scanning unit, generally designated at 232 is provided for use in connection with pattern drum 148, being mounted adjacent thereto on a bracket 234. Figs. 10 and 11 of the drawings illustrate, by way of example, developments of representative pattern cards which may be employed in connection with the scanning devices controlling the vertical movement of the spindle head, in accordance with the requirement of a profile milling operation. Each of these cards comprises a sheet of black paper, or preferably a dull finish black phenol resin cylinder having indicia in the form of aluminum or silvered spots, capable of reflecting light from the source onto the photo-electric cell. In the example shown (see Fig. 10), it is assumed that one revolution of the drum 112 equals one-half inch of longitudinal travel of the work supporting table 22. The drum card 136 is divided into eight equal spaces, so that each space represents $\frac{1}{16}$ of an inch of table travel. The helical lines on the drum card 136 have a lead equal to the thread on the drum spindle support 114. The indicia toward the right hand end of the drum as viewed in Fig. 2, and specifically illustrated as helical comprising the upper half of the card 136 in Fig. 10, operate to start the spindle head motor, which is subsequently stopped by the control from the pattern drum 148. The indicia toward the left hand end of the drum and comprising the lower portion of card 136 in Fig. 10, control the direction of rotation of the spindle head motor 100.

As shown in Fig. 11, the pattern card 149 associated with the pattern drum 148 on the machine column, is arranged so that one revolution of the drum equals .250" of vertical travel of the spindle head. This card is divided into 125 equal spaces, of which each space represents .002" of spindle head travel. The helical lines are spaced to represent the width of the track followed by the scanning device, and have a lead equal to the lead of the screw thread on the sleeve support 150 for the drum 148.

The electrical connections whereby the pattern control scanning devices above described are rendered operative to control the starting and stopping, and direction of movement of the spindle head motor 100, are intended for use in connection with the electrical control system for a milling machine particularly illustrated and described in the patent to Bennett and Krause above referred to. Inasmuch as the construction and operation of the electrical connections for controlling the starting and stopping and direction of movement of the work supporting table and of the milling cutter spindle form specifically no part of the present invention, and are fully described in the patent above referred to, specific illustration of the same is herein omitted, except so far as is believed necessary to illustrate the connection of applicants' profile mechanism therewith. As will be evident from Fig. 12 of the drawings, the operation of the head vertical motor 100 is controlled by the vertical motor reversing contacts VU—VD which are in turn controlled by relays VU and VD. The drum reversing clutch solenoid 204 above referred to, is noted as VCD. There are also provided a number of auxiliary relays which include a vertical holding relay VH and vertical stop relay VS, a vertical start relay HS and a vertical reverse relay UD.

A plugging switch is provided for electrically braking the vertical head motor 100 to a stop. This switch is similar to those illustrated in the Bennett et al patent above referred to, but will be briefly described in connection with Fig. 6 and the diagrammatic illustration of Fig. 12. The switch mechanism comprises a drum-shaped member 260 rigidly secured to the armature shaft 102 of the motor 100, and a hollow drum or band 264 which is fitted loosely over the drum 260. The drum 260 and band 264 are partially immersed in an oil bath, and are so constructed and arranged that rotation of the motor shaft and drum 260 will set up a film of oil between the drum 260 and the band 264 which provides sufficient resistance to bias the band 264 in the direction of rotation. The band 264 is provided at its upper side with a lug 266, to which are connected switch plungers 268, 270 for controlling the plugging switch connections. Compression springs 272, 273 coiled about the plungers 268, 270 tend to center the plungers and band 264 in an intermediate position in which both plugging switches are disengaged.

The operation of applicants' automatic profile control mechanism to effect an adjustment in the position of the milling cutter spindle toward the work during the performance of a milling cut, will be briefly described as follows:

Assuming that the work table has started moving to the right and that the pattern card 136 has been brought into position so that the light beams from the lights 220 and 224 are at the starting points of their respective indicia with the object of starting the vertical spindle motor 100 moving up, the following operations take place.

In Fig. 10, the light beam from the light 224 is at first not reflected into the photo-electric cell 226 since it strikes a non-reflecting part of the pattern card. Therefore no current flows in the photo-electric cell and relay UD is not energized. Contact UD 38—44 remains closed so that the closing of starting contact HS 44—6 will energize relay VU to start the vertical spindle head motor 100 rotating in a direction to move the spindle head up. Contact UD 46—44 remains open so that the closing of the starting contact HS 44—6 would be ineffective to energize relay VD. Contact UD 52—6 remains open allowing spring 188 to maintain the position of drum reversing switch solenoid VCD and the direction of rotation of the pattern drum 148.

As the pattern card 136 rotates in synchronism with the table movement the light beams from lights 220 and 224 follow the helical tracks thereon. As the first reflecting spot comes into the path of the light beam from light 220 it acts to reflect light onto photo-electric cell 222 increasing the current in the cell. This increased current acts through amplifier 242 to close the circuit through starting relay HS to energize the same. Contact HS 44—6 closes and since contact UD 38—44 is closed as above described, relay VU is energized to start the vertical spindle head motor and spindle head moving up. Contact HS 51—6 closes at substantially the same time energizing relay VH. Contact VH 49—50 closes forming a holding circuit for relay VH and contact VH 44—50 closes maintaining a closed circuit through relay VU even though contact HS 44—6 is open as record card 136 continues rotation and the reflecting spot leaves the path of the light beam from light 220.

Figure 12:
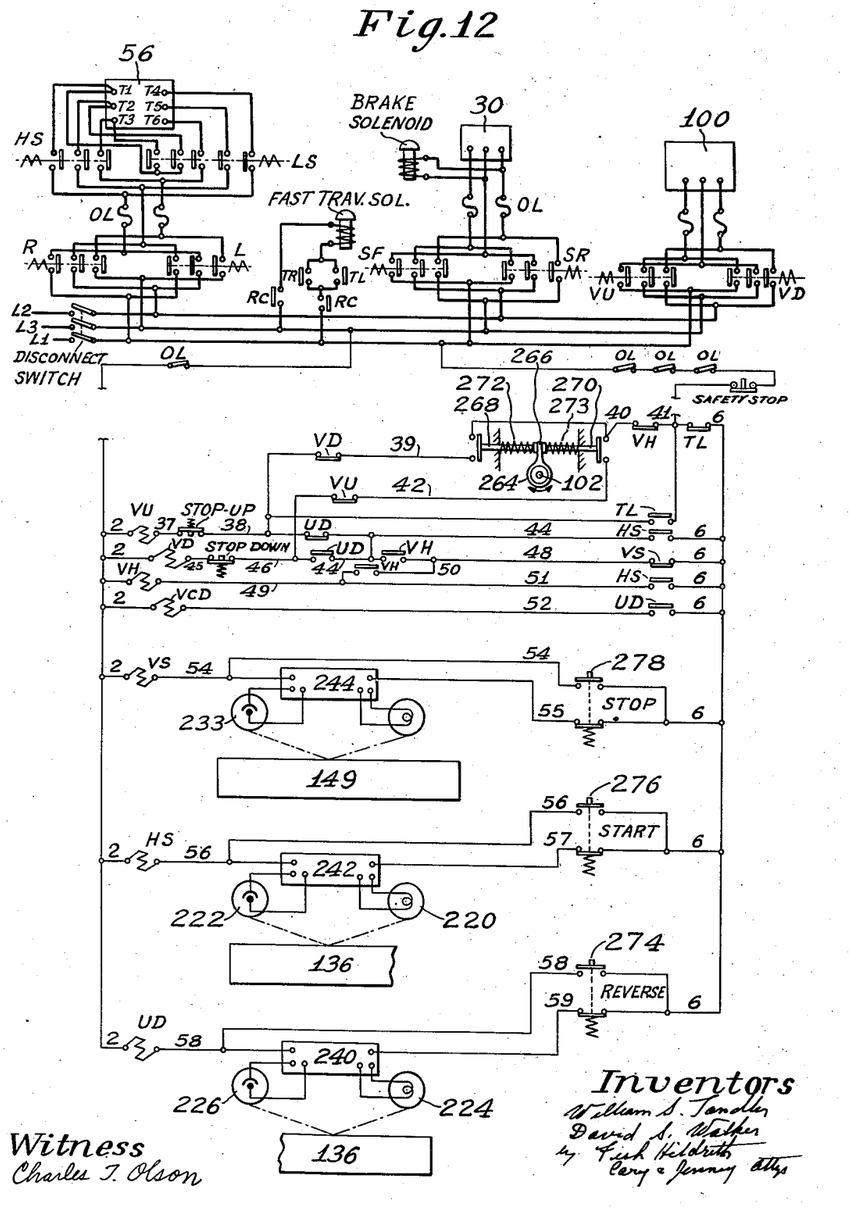
Fig. 12 is a diagrammatic view of the electrical connections.

The operation of the electrical connections to stop movement of the spindle head motor 100 is as follows: When the spindle head has been moved the desired distance, a light reflecting spot on the pattern card 149 of the pattern drum 148 will move into register with the light beam from the scanning unit 232. The increased current induced in photo-electric cell 233 then acts through amplifier unit 244 to energize the vertical stop relay VS. Contact VS 48—6 opens de-energizing the vertical holding relay VH, and also opening the circuit to the vertical spindle head motor switch relay VU. Contact VH 40—41 closes as relay VH is de-energized, thus bringing into operation the plugging switch connections for plugging the vertical head motor 100 to a quick stop. With the spindle head motor operating in the down direction, the plugging switch comprising band 246 will be positioned so that contact 42—40 is closed. As relay VU is deenergized, as above noted, contact VU 42—46 closes, energizing relay VD to reverse the spindle head motor 100. As the motor is now plugged to a stop, the plugging switch again returns to its neutral position under the influence of springs 272, 273, opening contact 42—40 and de-energizing relay VD, thus leaving the vertical head motor 100 in its stationary position.

The operations above described will be repeated for each of a series of upward adjusting movements of the spindle head and cutter spindle. In accordance with the preferred operation of the device, an extremely large number of stepped adjustments, each of very small extent, will be employed.

The operation of the scanning mechanism to produce a stepped downward movement of the spindle head and cutter spindle is as follows: When it is proposed to start the spindle head motor moving down, a light reflecting spot on the pattern drum 136 causes light to be reflected against photo-electric cell 222 to de-energize relay HS. For this operation, it must be assumed that the broad band of light reflecting material on card 136 has come into range of the beam from light 224 so that the current in photo-electric cell 226 is increased and closes the contact through amplifier 240 and energizes relay UD. Contact UD 38—44 is opened and vertical motor up switch relay VU cannot be energized. Contact HS 44—6 closes, and since contact UD 44—46 is closed, the vertical motor down switch relay VD closes, thus starting the vertical spindle head motor moving downward. The energizing of the vertical starting relay HS closes contact 51—6 energizing the vertical holding relay VH. Contact VH 44—50 closes maintaining the circuit through VD. It will be noted that when relay UD is energized, UD contact 52—6 closes, thus energizing the drum reversing solenoid VCD to shift clutch sleeve 176 from one to the other position, and thereby reverse the direction of rotation of the pattern drum 148 with respect to the worm gear 106 and feed screw 108. The operation of these switch contacts insures that the pattern drum 148 is always driven in the same direction, irrespective of the direction of rotation of the spindle head motor 100 in effecting adjustment up or down, as the case may be. When it is again desired to stop the spindle head motor 100 from its downward movement, a light reflecting spot on pattern card 149 will actuate the scanning device 232, increasing current through photo-electric cell 233, and energizing the vertical stop relay VS. The operation in stopping is similar to that previously described in connecton wth the stopping of up movement.

Figure 13:
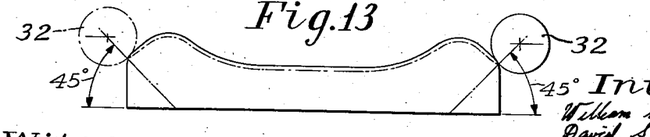
Fig. 13 is a contour milled work piece produced by the pattern cards illustrated in Figs. 10 and 11.

For purposes of illustration, the pattern cards 136 and 149 illustrated in Figs. 10 and 11 respectively, are laid out to cause the machine to produce the milled contour of Fig. 13. During the first portion of the operation, it will readily be seen that the spindle head has started moving up in a series of jogs which are spaced from one another to produce the desired upward curve. As the milling cutter reaches the top of the contour, the direction of movement of the spindle head motor is reversed, and a rapid series of short jogging movements are imparted thereto which are particularly intended to overcome the backlash present in the spindle head screw and nut driving connection. The reversal in the direction of drive takes place as the light beam controlling the direction of drive rides onto the first silvered band on the lower portion of the pattern card 136. Movement of the spindle head motor in the down direction is continued in a series of jogs spaced to produce the first downward slope of the contour. When it becomes necessary to level off for the production of that portion of the milled contour which is at constant level, the direction of drive of the spindle head motor is again reversed in the upward direction in a series of short jogging movements which are sufficient only to eliminate the backlash in the screw and nut connections. There follows a period during which the spindle head motor is entirely inactive as indicated by the gaps in the starting indicia of pattern card 136, particularly in the convolutions numbered eleven through fourteen inclusive, of the track. The sequence of operations above noted is repeated for the formation of the second upward and downward curve of the contour. A series of jogging movements are imparted to the head motor and spindle head driven thereby, spaced to form the upward portion of the second curve. The direction of movement of the spindle head motor is then reversed with a series of short jogging movements to take out the backlash in the screw and nut connection at the top of the curve. Finally, the spindle head motor is driven in a downward direction in a series of jogs spaced to form the last downwardly sloped portion of the milled contour.

Applicants' profiling attachment has the particular advantage that it may be readily disconnected, leaving the machine available for operation as an ordinary milling machine, and this without the necessity of alterations or removal of non-essential or interfering parts. As will readily be evident from an inspection of the electrical diagram of Fig. 12, control of the spindle head motor 100 by the pattern mechanism will be eliminated by disabling or disconnecting amplifiers 240, 242 and 244. This may be accomplished either through the placing of entirely black pattern cards on the pattern drums 116—148, or by disconnecting the amplifying circuits through the agency of switch connections not here shown. In order to render the head spindle motor 100 available for manual control, manually operable controls are provided for energizing the starting, stopping and reversing relays HS, VS and UD, respectively. A reversing switch is provided under the control of a reversing button 274 for closing a shunt circuit to energize relay UD. Similarly, a starting switch is provided under the control of a button 276 for closing a shunt circuit to energize starting relay HS. A stop switch is provided under the control of a stop button 278 for for closing a shunt circuit to energize the vertical stop relay VS. The operation of these relays has been described. It will be noted that the pressing of the start button 276 alone will start the spindle head moving up. A simultaneous pressing of the start button 276 and reversing button 274 is required to start the spindle head moving down. When the profiling attachment is not in operation, the hand lever 208 will be turned to its neutral position to disconnect the pattern drum 148 from its driving and reversing mechanism.

It will be understood that the invention is not limited to the specific embodiment shown, and that various deviations may be made therefrom without departing from the spirit and scope of the appended claims.

What is claimed is:

1. In a machine tool having a plurality of supports movable in diverse directions, a control mechanism for effecting relative movement of said supports in accordance with a predetermined pattern comprising a pattern element connected to be advanced in timed relation by one of said supports, and means actuated thereby for initiating relative movement, a pattern element connected to be advanced in timed relation by the other of said supports, and means actuated by said latter pattern element for stopping said relative movement.

2. In a machine tool having a plurality of supports movable in diverse directions, a control mechanism for effecting relative movement of said supports in accordance with a predetermined pattern comprising a pattern element connected to be advanced in timed relation by one of said supports, and means actuated thereby for initiating movement of the other of said supports in a diverse direction, a pattern element connected to be advanced in timed relation by said other support, and means actuated by said latter pattern element for stopping movement of said other support.

3. In a machine tool having a plurality of supports movable in diverse directions, a control mechanism for effecting a step-by-step relative movement of said supports in accordance with a predetermined pattern comprising a pattern element connected to be advanced in synchronism with one of said supports and means actuated thereby for initiating successive stepped movements of the other of said supports in a diverse direction, a pattern element connected to be advanced in synchronism with said other support, and means actuated by said latter pattern element for stopping each of said successive stepped movements of said other support.

4. In a machine tool having supports arranged for back and forth movements in diverse paths, a control mechanism for effecting a series of stepped relative movements of said supports in accordance with a predetermined pattern, comprising a pattern element connected to be advanced in synchronism with one of said supports and means actuated thereby for initiating each succession stepped movement of the other of said supports and for determining the direction of said movement, a pattern element connected to be advanced in synchronism with said other support, and means actuated by said latter pattern element for stopping movement of said other support.

5. In a machine tool having a tool holder and a work support, means for effecting a series of stepped relative movements of the tool holder and support in two diverse directions, a pattern device connected for movement in timed relation with said relative movement in one direction, a pattern device connected for movement in timed relation with the relative movement in a diverse direction, and means controlled by said pattern devices for controlling the movement in said diverse direction comprising means actuated by the first-named pattern device to start each succession stepped movement in said diverse direction, and means actuated by said last-named pattern device to stop the movement in said diverse direction.

6. In a machine tool having a tool holder and a work support, means for effecting relative translatory movement of said tool holder and support, means for effecting relative transverse movement of said tool holder and work support, and a profiling device comprising a pattern element connected for movement in timed relation with said means for effecting relative translatory movement, a pattern element connected for movement in timed relation with said means for effecting relative transverse movement, means actuated by said first-mentioned pattern element for instituting said transverse movement, and means actuated by said latter pattern element to stop said transverse movement.

7. In a machine tool having a tool holder and a work support, means for effecting relative translatory movement of said tool holder and support, means for effecting relative transverse movement of said tool holder and work support including means for reversing the direction of relative transverse movement, and a profiling device comprising a pattern element connected for movement in timed relation with said means for effecting relative translatory movement, a pattern element connected for movement in timed relation with said means for effecting relative transverse movement, means actuated by said first-mentioned pattern element for instituting said transverse movement and for determining the direction thereof, and means actuated by said latter pattern element to stop said transverse movement.

8. In a machine tool having a tool holder and a work support, means for effecting relative translatory movement of said tool holder and support, means for effecting relative transverse movement of said tool holder and work support including means for reversing the direction of relative transverse movement, and a profiling device having a stepped operation which comprises a pattern element connected for movement in timed relation with said means for effecting relative translatory movement, a pattern element connected for movement in timed relation with said means for effecting relative transverse movement, means actuated at selected intervals by said first-mentioned pattern element for instituting said transverse movement and for determining the direction thereof, and means actuated by said latter pattern element to stop said transverse movement.

9. In a machine tool having a tool holder and a work support, means for effecting relative translatory movements of said tool holder and support, means for effecting relative transverse movement of said tool holder and support including means for reversing the direction of relative transverse movement, and a profiling device comprising a pattern drum with indicia thereon connected to be rotated in timed relation from said means for effecting relative translatory movement, a second pattern drum with indicia thereon connected to be rotated in timed relation with said means for effecting relative transverse movement, means responsive to the dictation of the indicia of said first-mentioned pattern drum for starting said transverse movement and for determining the direction thereof, and means responsive to the dictation of the indicia of said latter pattern drum to stop said transverse movement.

10 In a machine tool having a tool holder and a work support, means for effecting relative translatory movement of said tool holder and support, means for effecting relative transverse movement of said tool holder and support including means for reversing the direction of relative transverse movement, and a profiling device comprising a pattern drum with indicia thereon connected to be rotated in timed relation with said means for effecting relative translatory movement, a second pattern drum, with indicia thereon, connected to be rotated in timed relation with said means for effecting relative transverse movement, means for reversing the direction of rotation of said second pattern drum relative to said transverse motion producing means, means responsive to the dictation of the indicia of said first-mentioned pattern drum for instituting said transverse movement, for determining the direction thereof, and for determining the direction of rotation of said latter pattern drum with respect to the direction of said transverse movement, and means responsive to the dictation of said second pattern drum to stop said transverse movement.

11. In a machine tool having a tool holder and a work support, means for effecting relative translatory movement of said tool holder and support, means for effecting relative transverse movement of said tool holder and support including means for reversing the direction of said relative transverse movement, and a profiling device comprising a pattern drum having indicia thereon and connected to be rotated and to be moved axially in timed relation with said means for effecting relative translatory movement, a second pattern drum having indicia thereon and connected to be rotated and to be moved axially in timed relation with said means for effecting relative transverse movement, means responsive to the dictation of the indicia of said first-mentioned pattern drum for starting said transverse movement and for determining the direction thereof, and means responsive to the dictation of the indicia of said second pattern drum to stop said transverse movement.

12. In a machine tool having a tool holder and a work support, means for effecting relative translatory movements of said tool holder and support, means for effecting relative transverse movement of said tool holder and support including means for reversing the direction of relative transverse movement, and a profiling device comprising a pattern element with indicia thereon connected to be advanced in timed relation from said means for effecting relative translatory movement, a second pattern element with indicia thereon connected to be advanced in timed relation from said means for effecting relative transverse movement, electrically operated devices responsive to the indicia of said first-mentioned pattern element for starting said transverse movement and for determining the direction thereof, and electrically operated devices responsive to the indicia of said second pattern element to stop said transverse movement.

13. In a machine tool having a tool holder and a work support, means for effecting relative translatory movement of said tool holder and support, means for effecting relative transverse movement of said tool holder and support including means for reversing the direction of relative transverse movement, and a profiling device comprising a pattern element having indicia thereon connected to be advanced in timed relation to said means for effecting relative translatory movement, a second pattern element with indicia thereon connected to be advanced in timed relation with said means for effecting relative transverse movement, electrically operated means responsive to the dictation of the indicia of said first-mentioned pattern drum for starting said transverse movement and for determining the direction thereof, and electrically operated means responsive to the dictation of said second pattern element to stop said transverse movement, said electrically operated means in each instance comprising a light source, a photo-electric cell responsive to variations in the intensity of light directed thereupon from the light source by said indicia, and actuating means controlled by said cell.

14. In a milling machine having a work table, a rotary milling cutter spindle and a spindle support, means for effecting relative translatory movement of said work table and spindle support, means for imparting relative transverse movement to the work table and spindle support including means for reversing the direction of said transverse movement, a pattern drum with indicia thereon arranged to be driven in timed relation from said means for effecting translatory movement, a pattern drum with indicia thereon arranged to be driven in timed relation from said means for effecting relative transverse movement, and including means for reversing the direction of rotation of said latter pattern drum with relation to its driving means, means responsive to the dictation of the indicia of said first-mentioned pattern drum for starting said relative transverse movement, for determining the direction thereof, and the direction of rotation of said latter pattern drum with relation to the direction of rotation of the drum, and means responsive to the dictation of the indicia of said latter pattern drum to stop said transverse movement.

15. In a milling machine, a milling cutter spindle, a spindle support, a work support, means for effecting relative translatory movement of said supports, means for effecting relative transverse shifting movement of said supports to move the milling cutter spindle toward and away from the work, a profiling attachment arranged for effecting relative transverse shifting movement of said supports in timed relation with the relative translatory movement thereof, which comprises pattern means operating in timed relation with said relative translatory movement to start said relative transverse movement, and pattern means operable in timed relation with said relative transverse movement to arrest the same.

16. In a milling machine, a milling cutter spindle, a spindle support, a work support, means for effecting relative translatory movement of said supports, means for effecting relative transverse shifting movement of said supports to move the milling cutter spindle toward and away from the work, a profiling attachment arranged for effecting a series of relative transverse shifting movements of said supports in timed relation with the relative translatory movement thereof which comprises pattern means operating at predetermined intervals in timed relation with the relative translatory movement of the supports to start each succeeding relative transverse movement, and pattern means operating in timed relation with said relative transverse movement to arrest each successive relative transverse shifting movement.

17. In a milling machine, a milling cutter spindle, a spindle support, a work support, means for effecting relative translatory movement of said supports, means for effecting relative transverse shifting movement of said supports to move the milling cutter spindle toward and away from the work, a profiling attachment arranged for effecting a series of relative transverse shifting movements of said supports in timed relation with the relative translatory movement thereof, which comprises pattern means operating at predetermined intervals in timed relation with said relative translatory movement to start said relative transverse movement, and to determine the direction thereof, and pattern means operable in timed relation with said relative transverse movement to arrest each successive relative transverse shifting movement of the supports.

18. In a milling machine, a milling cutter spindle, a spindle support, a work support, means for effecting relative translatory movement of said supports, means for effecting relative transverse shifting movement of said supports to move the milling cutter spindle toward and away from the work, a profiling attachment arranged for effecting a series of relative transverse shifting movements of said supports in timed relation with the relative translatory movement thereof which comprises a plurality of pattern control units including pattern units synchronized with each of said relative translatory and relative transverse movements of the supports, said pattern units controlling respectively the starting and stopping of the relative transverse movement of the supports.

19. In a milling machine, a milling cutter spindle, a spindle support, a work support, means for effecting relative translatory movement of said supports, means for effecting relative transverse shifting movement of said supports to move the milling cutter spindle toward and away from the work, a profiling attachment arranged for effecting a series of relative transverse shifting movements of said supports in timed relation with the relative translatory movement thereof which comprises a plurality of pattern control units including pattern units synchronized with each of said relative translatory and transverse movements of the supports, and arranged to control respectively the starting and stopping of the relative transverse movement of the supports, each of said pattern units comprising a moving pattern element having indicia thereon, a light source, and electrical connections including a photo-electric cell sensitive to variations of light transmitted thereto from the light source by said indicia, and actuating means controlled by said cell.

20. In a milling machine, the combination of a milling cutter spindle, a vertically adjustable spindle support, a longitudinally movable work support, power means for driving the spindle support, and a profiling attachment for imparting a series of stepped movements to the spindle support in timed relation with movement of the work support for the milling of a profile surface, which comprises a pattern drum connected to be driven in synchronism with said work support, and a control responsive to the dictation of said drum to start movement of the spindle support and to control the direction of said movement, and a pattern drum connected to be driven in synchronism with the spindle support, and means responsive to the dictation of said drum to arrest each successive shifting movement of the spindle support.

21. In a milling machine, the combination of a milling cutter spindle, a vertically adjustable spindle support, a longitudinally movable work support, driving connections for the work support, a reversible electric motor and driving connections therefrom for the spindle support, and a profiling attachment comprising pattern control means for imparting a series of step-by-step positioning movements to the spindle support in timed relation with the movement of the work support, said pattern control means including a pattern element arranged for movement in synchronism with the spindle support, and means responsive to the dictation of said pattern element to arrest each successive stepped movement of the spindle support.

22. In a machine tool having a plurality of supports arranged for movement in diverse paths and driving means for each of said supports, a pattern control mechanism for effecting a series of stepped relative positioning movements of said supports in accordance with a predetermined pattern which comprises pattern elements with arbitrary indicia thereon, and actuating means responsive to the dictation of said indicia for starting and stopping and for controlling the direction of each of a series of stepped positioning movements of at least one of the supports to produce a contoured pattern of relative movement.

23. In a machine tool having a plurality of supports arranged for movement in diverse paths and driving means for each of said supports, a pattern control mechanism for effecting a series of stepped relative positioning movements of said supports in accordance with a predetermined pattern which comprises individual pattern elements movable in synchronism with each of said supports and having arbitrary indicia thereon, and actuating means responsive to the dictation of said indicia for starting and stopping and for controlling the direction of each of a series of stepped positioning movements of at least one of the supports to produce a contoured pattern of relative movement.

24. In a milling machine, the combination of a milling cutter spindle, a vertically adjustable spindle support, a longitudinally movable work support, driving means for the work support, reversible driving means for the spindle support, and pattern means for controlling the operation of the spindle support including a pattern drum, reversible connections through which the drum is driven from said spindle support driving means in synchronism with the movement of the spindle support, and means for actuating said reversible connections to maintain a uni-directional operation of said pattern drum irrespective of the direction of drive of said reversible driving means for the spindle support.

25. In a milling machine, the combination of a milling cutter spindle, a vertically adjustable spindle support, a longitudinally movable work support, driving means for the work support, reversible driving means for the spindle support, and pattern means for controlling the operation of the spindle support including a pattern drum, a screw-threaded support on which the drum is mounted for rotational and axial movement, a reversing clutch through which the drum is driven from said spindle support driving means in synchronism with the movement of the spindle support, and means operative in starting the spindle support to position said clutch to correspond with the direction of drive of said reversible driving means for the spindle support to maintain a unidirectional operation of the pattern drum.

26. In a milling machine, the combination of a milling cutter spindle, a vertically adjustable spindle support, a longitudinally movable work support, driving means for the work support, reversible driving means for the spindle support, and pattern means for controlling the operation of the spindle support including a pattern drum, a screw-threaded support on which the drum is mounted for rotational and axial movement, a reversing clutch through which the drum is driven from said spindle support driving means in synchronism with the movement of the spindle support, means operative in starting the spindle support to position said clutch to correspond with the direction of drive of said reversible driving means for the spindle support to maintain a uni-directional operation of the pattern drum, and a manual control shiftable to move said reversing clutch to a neutral position.

27. In a milling machine, the combination of a milling cutter spindle, a vertically adjustable spindle support, a longitudinally movable work support, driving means for the work support, a reversible electric motor for driving the spindle support, and pattern means for controlling the operation of the spindle support for profile milling including a pattern drum, a reversing clutch through which the drum is arranged to be driven from said motor continuously in the same direction in synchronism with the movement of the spindle support, starting, stopping and reversing relays, and electrical connections controlled thereby for starting, stopping and reversing the motor and for correspondingly positioning the reversing clutch, energizing means including individual photo-electric cells associated with each of said relays, a source of light, and pattern elements including said drum having indicia for directing a variable amount of light on said cells.

WILLIAM S. TANDLER.
DAVID S. WALKER.